(12) United States Patent
Suissa et al.

(10) Patent No.: US 11,794,777 B1
(45) Date of Patent: Oct. 24, 2023

(54) SYSTEMS AND METHODS FOR ESTIMATING HEADING AND YAW RATE FOR AUTOMATED DRIVING

(71) Applicant: GM GLOBAL TECHNOLOGY OPERATIONS LLC, Detroit, MI (US)

(72) Inventors: Avshalom Suissa, Ganei Tikva (IL); Jimmy Lu, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/812,622

(22) Filed: Jul. 14, 2022

(51) Int. Cl.
*B60W 40/00* (2006.01)
*B60W 60/00* (2020.01)
*B60W 40/114* (2012.01)

(52) U.S. Cl.
CPC ........ *B60W 60/001* (2020.02); *B60W 40/114* (2013.01); *B60W 2510/222* (2013.01); *B60W 2520/06* (2013.01); *B60W 2520/10* (2013.01); *B60W 2520/14* (2013.01); *B60W 2530/10* (2013.01); *B60W 2530/201* (2020.02); *B60W 2552/15* (2020.02)

(58) Field of Classification Search
None
See application file for complete search history.

(56) References Cited

U.S. PATENT DOCUMENTS

| | | | |
|---|---|---|---|
| 2003/0040849 A1* | 2/2003 | Hathout | B60W 50/0097 701/1 |
| 2020/0130529 A1* | 4/2020 | Seong | G07C 5/08 |
| 2021/0129838 A1* | 5/2021 | Hultén | B62D 6/002 |
| 2021/0163068 A1* | 6/2021 | Zhu | B62D 15/0285 |
| 2022/0324484 A1* | 10/2022 | Hruschka | B60W 30/0956 |
| 2023/0159024 A1* | 5/2023 | Loeffler | B60W 30/095 701/26 |
| 2023/0166770 A1* | 6/2023 | Funke | B60W 60/0025 701/25 |

\* cited by examiner

*Primary Examiner* — James M McPherson
(74) *Attorney, Agent, or Firm* — Lorenz & Kopf, LLP (57) ABSTRACT

Motion control systems and methods are provided in a vehicle. In one embodiment, a motion control system includes a controller. The controller is configured to: receive target trajectory data associated with an upcoming trajectory of the autonomous vehicle; determine a yaw rate reference and a relative heading reference associated with the upcoming target trajectory based on a numerical integration of the target trajectory data; and control a trajectory of the autonomous vehicle based on the yaw rate reference and the relative heading reference.

20 Claims, 6 Drawing Sheets

SYSTEMS AND METHODS FOR ESTIMATING HEADING AND YAW RATE FOR AUTOMATED DRIVING

INTRODUCTION

The technical field generally relates to vehicle motion control systems, and more particularly relates to improving motion control system performance based on heading and yaw rate control references for trajectory tracking.

Conventional heading and yaw rate references would be set equal to the target trajectory heading and the trajectory curvature. The heading reference is sometimes augmented by a steady-state sideslip angle to compensate for the non-zero relative yaw angle during curve tracking. These approaches assume the references are quasi-steady and are valid only during highway driving. In low-speed maneuvering, the finite yaw acceleration and rate of change of sideslip are significant.

Accordingly, it is desirable to provide improved heading and yaw rate references for trajectory tracking. It is further desirable to use the trajectory tracking to improve motion control using the trajectory tracking. Furthermore, other desirable features and characteristics of the present disclosure will become apparent from the subsequent detailed description and the appended claims, taken in conjunction with the accompanying drawings and the foregoing technical field and background.

SUMMARY

A motion control system is provided in a vehicle. In one embodiment, the motion control system including a controller. The controller is configured to: receive target trajectory data associated with an upcoming trajectory of the autonomous vehicle; determine a yaw rate reference and a relative heading reference associated with the upcoming target trajectory based on a numerical integration of the target trajectory data; and control a trajectory of the autonomous vehicle based on the yaw rate reference and the relative heading reference.

In various embodiments, the target trajectory data includes a desired vehicle velocity.

In various embodiments, the target trajectory data includes a trajectory curvature.

In various embodiments, the target trajectory data includes a road banking angle.

In various embodiments, the numerical integration is based on a bicycle model.

In various embodiments, the numerical integration of the yaw rate reference is based on:

$$\dot{\psi}\left(s^2 + l_r \frac{LC_r}{I_{zz}V_x}s + L\frac{C_r}{I_{zz}}\right) = l_f \frac{m}{I_{zz}}(\dot{\kappa}_d V_x^2 + g\dot{\phi}) + LV_x \kappa_d \frac{C_r}{I_{zz}},$$

where $V_x$ represents a desired velocity, $\dot{\kappa}_d$ represents a desired trajectory, $\emptyset$ represents a road banking angle, $\psi$ represents the yaw rate reference, m represents a mass of the autonomous vehicle, g represents gravity, $C_r$ represents a cornering stiffness on a rear tire, L represents a vehicle wheel base, $l_r$ represents a distance between a rear axle and a center of gravity, $I_{zz}$ represents a vehicle moment of inertia relative to a vertical axis, and $l_f$ represents a distance between a front axes and the center of gravity.

In various embodiments, the numerical integration of the relative heading reference is based on:

$$\dot{\beta} = -\frac{LC_r}{l_f m V_x}\beta + \ddot{\psi}\frac{I_{zz}}{l_f m V_x} + \dot{\psi}\left(l_r \frac{LC_r}{I_{zz}V_x^2} - 1\right) - \frac{g\phi}{V_x},$$

where $\beta$ represents relative heading, $V_x$ represents a desired velocity, $\dot{\kappa}_d$ represents a desired trajectory, $\emptyset$ represents a road banking angle, $\psi$ represents the yaw rate reference, m represents a mass of the autonomous vehicle, g represents gravity, $C_r$ represents a cornering stiffness on a rear tire, L represents a vehicle wheel base, $l_r$ represents a distance between a rear axle and a center of gravity, $I_{zz}$ represents a vehicle moment of inertia relative to a vertical axis, and $l_f$ represents a distance between a front axes and the center of gravity.

In another embodiment a method includes: receiving, by a processor, target trajectory data associated with an upcoming trajectory of the autonomous vehicle; determining, by the processor, a yaw rate reference and a relative heading reference associated with the upcoming target trajectory based on a numerical integration of the target trajectory data; and controlling, by the processor, a trajectory of the autonomous vehicle based on the yaw rate reference and the relative heading reference.

In various embodiments, the target trajectory data includes a desired vehicle velocity.

In various embodiments, the target trajectory data includes a trajectory curvature.

In various embodiments, the target trajectory data includes a road banking angle.

In various embodiments, the numerical integration is based on a bicycle model.

In various embodiments, the numerical integration of the yaw rate reference is based on:

$$\dot{\psi}\left(s^2 + l_r \frac{LC_r}{I_{zz}V_x}s + L\frac{C_r}{I_{zz}}\right) = l_f \frac{m}{I_{zz}}(\dot{\kappa}_d V_x^2 + g\dot{\phi}) + LV_x \kappa_d \frac{C_r}{I_{zz}},$$

where $V_x$ represents a desired velocity, $\dot{\kappa}_d$ represents a desired trajectory, $\emptyset$ represents a road banking angle, $\psi$ represents the yaw rate reference, m represents a mass of the autonomous vehicle, g represents gravity, $C_r$ represents a cornering stiffness on a rear tire, L represents a vehicle wheel base, $l_r$ represents a distance between a rear axle and a center of gravity, $I_{zz}$ represents a vehicle moment of inertia relative to a vertical axis, and $l_f$ represents a distance between a front axes and the center of gravity.

In various embodiments, the numerical integration of the relative heading reference is based on:

$$\dot{\beta} = -\frac{LC_r}{l_f m V_x}\beta + \ddot{\psi}\frac{I_{zz}}{l_f m V_x} + \dot{\psi}\left(l_r \frac{LC_r}{I_{zz}V_x^2} - 1\right) - \frac{g\phi}{V_x},$$

where $\beta$ represents relative heading, $V_x$ represents a desired velocity, $\dot{\kappa}_d$ represents a desired trajectory, $\emptyset$ represents a road banking angle, $\psi$ represents the yaw rate reference, m represents a mass of the autonomous vehicle, g represents gravity, $C_r$ represents a cornering stiffness on a rear tire, L represents a vehicle wheel base, $l_r$ represents a distance between a rear axle and a center of gravity, $I_{zz}$ represents a vehicle moment of inertia relative to a vertical axis, and $l_f$ represents a distance between a front axes and the center of gravity.

In another embodiments, a non-transitory computer readable media encoded with programming instructions configurable to cause a controller in a vehicle to perform a method of motion control is provided. The method includes: receiving target trajectory data associated with an upcoming trajectory of the autonomous vehicle; determining a yaw rate reference and a relative heading reference associated with the upcoming target trajectory based on a numerical integration of the target trajectory data; and controlling a trajectory of the autonomous vehicle based on the yaw rate reference and the relative heading reference.

In various embodiments, the target trajectory data includes a desired vehicle velocity, a trajectory curvature, and a road banking angle.

In various embodiments, the numerical integration is based on a bicycle model.

In various embodiments, the numerical integration of the yaw rate reference is based on:

$$\dot{\psi}\left(s^2 + l_r \frac{LC_r}{I_{zz}V_x}s + L\frac{C_r}{I_{zz}}\right) = l_f \frac{m}{I_{zz}}\left(\dot{k}_d V_x^2 + g\phi\right) + LV_x k_d \frac{C_r}{I_{zz}},$$

and wherein the numerical integration of the relative heading reference is based on:

$$\dot{\beta} = -\frac{LC_r}{l_f mV_x}\beta + \ddot{\psi}\frac{I_{zz}}{l_f mV_x} + \dot{\psi}\left(l_r \frac{LC_r}{I_{zz}V_x^2} - 1\right) - \frac{g\phi}{V_x},$$

where $V_x$ represents a desired velocity, $\dot{k}_d$ represents a desired trajectory, $\phi$ represents a road banking angle, $\psi$ represents the yaw rate reference, m represents a mass of the autonomous vehicle, g represents gravity, $C_r$ represents a cornering stiffness on a rear tire, L represents a vehicle wheel base, $l_r$ represents a distance between a rear axle and a center of gravity, $I_{zz}$ represents a vehicle moment of inertia relative to a vertical axis, and $l_f$ represents a distance between a front axes and the center of gravity.

In various embodiments, the numerical integrations are performed based on a detected receding horizon, and initial conditions of the numerical integrations are reinitialized at a start of the horizon and at every loop time of the motion control.

In various embodiments, the numerical integrations are performed for each point along a receding horizon independently of each other, and initial conditions of the numerical integration are reinitialized at a start of the motion control.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
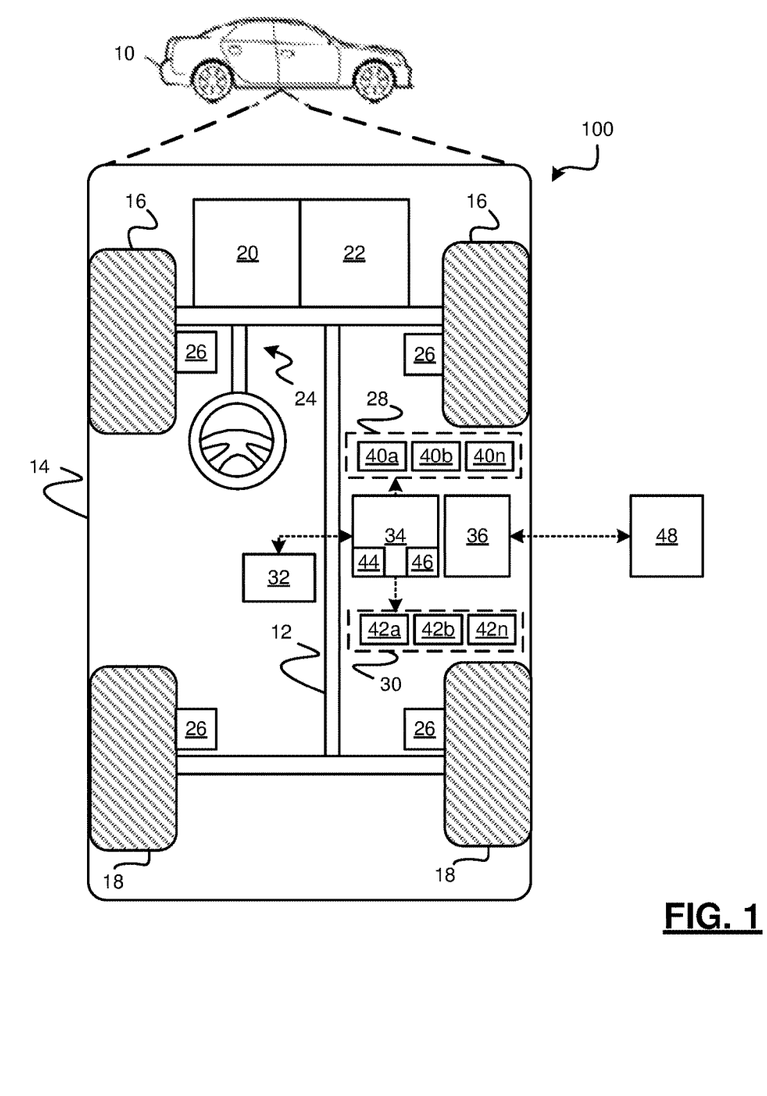
FIG. 1 is a block diagram illustrating an autonomous vehicle having a trajectory tracking system in accordance with various embodiments.

With reference to FIG. 1, a trajectory tracking system shown generally at 100 is associated with a vehicle 10 in accordance with various embodiments. In general, the trajectory tracking system 100 receives data sensed from an environment of the vehicle 10, processes the received data to compute a reference heading and a reference yaw rate coupled with host vehicle dynamics, which accounts for finite yaw acceleration and varying sideslip angle during curve negotiation. In various embodiments, the tracking system 100 uses the references for single-point error-feedback of trajectory tracking, such as error feedback and feedforward, as well as receding horizon based optimal control, such as model predictive control.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the trajectory tracking system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
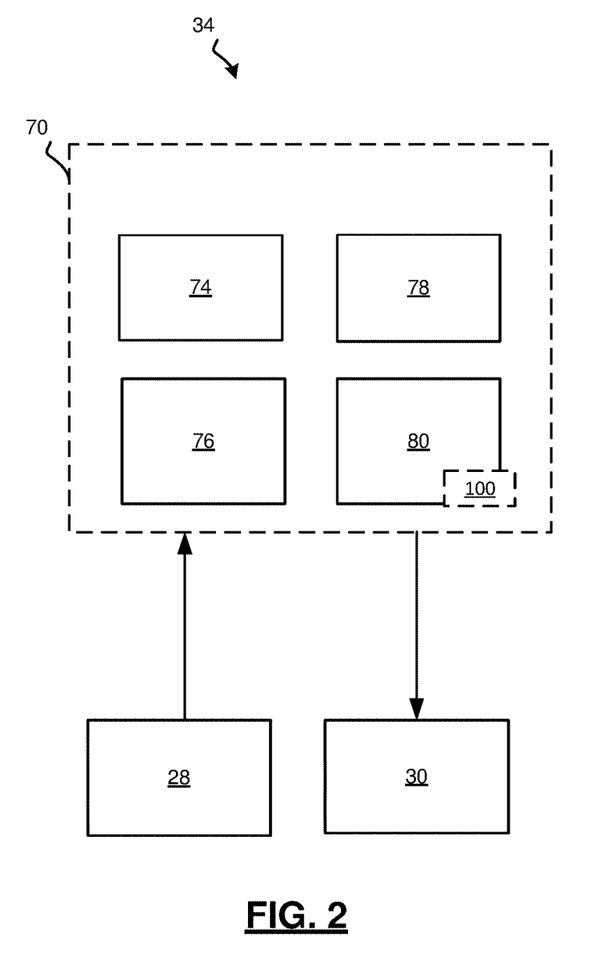
FIG. 2 is a functional block diagram illustrating features of an autonomous driving system of the autonomous vehicle in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, as discussed in detail below, one or more instructions of the controller 34 are embodied in the trajectory tracking system 100 and, when executed by the processor 44, process sensor data with a bicycle model in order to determine a references values for heading and yaw rate, and use the reference values for tracking of the trajectory of the vehicle.

Figure 3:
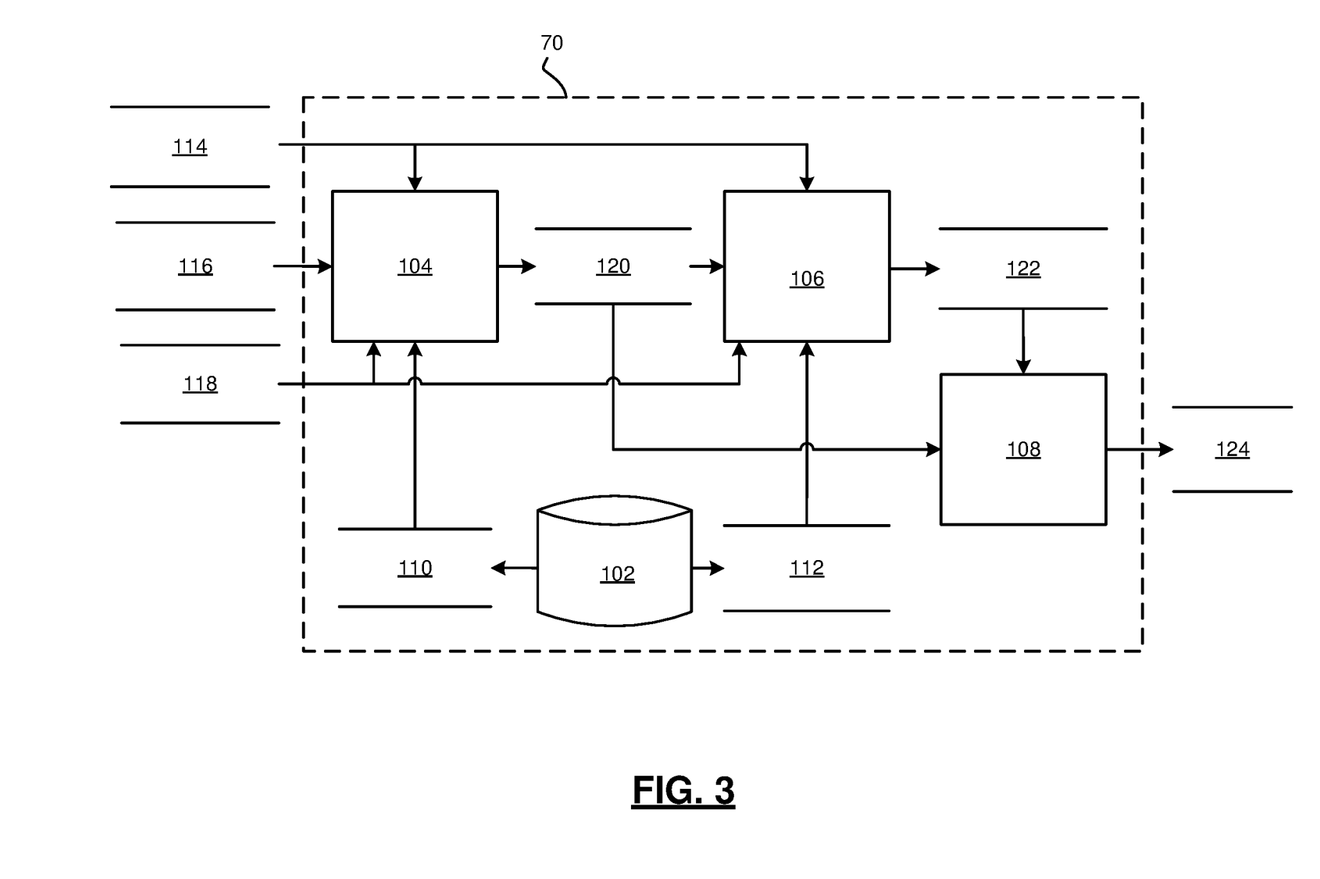
FIG. 3 is a dataflow diagram illustrating features of the trajectory tracking system of the autonomous driving system in accordance with various embodiments.

Referring now to FIG. 3, and with continued reference to FIG. 1, a dataflow diagram illustrates various embodiments of an autonomous driving system (ADS) 70 which may be embedded within the controller 34 and which may include parts of the trajectory tracking system 100 in accordance with various embodiments. That is, suitable software and/or hardware components of controller 34 (e.g., processor 44 and computer-readable storage device 46) are utilized to provide an autonomous driving system 70 that is used in conjunction with vehicle 10.

Inputs to the autonomous driving system 70 may be received from the sensor system 28, received from other control modules (not shown) associated with the autonomous vehicle 10, received from the communication system 36, and/or determined/modeled by other sub-modules (not shown) within the controller 34. In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to, cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as obstruction mitigation, route traversal, mapping, sensor integration, ground-truth determination, and feature detection, and object classification as discussed herein.

As mentioned briefly above, trajectory tracking system 100 of FIG. 1 computes reference values for tracking the trajectory of the vehicle 10. All or parts of the trajectory tracking system 100 may be included within, for example, the vehicle control system 80.

For example, as shown in more detail with regard to FIG. 3 and with continued reference to FIGS. 1 and 2, the trajectory tracking system 100 includes a model datastore 102, a yaw rate determination module 104, a relative heading determination module 106, and a trajectory control module 108.

The model datastore 102 stores models for use in computing the reference values. In various embodiments, the models are based on a bicycle model and the following relationships.

Figure 4:
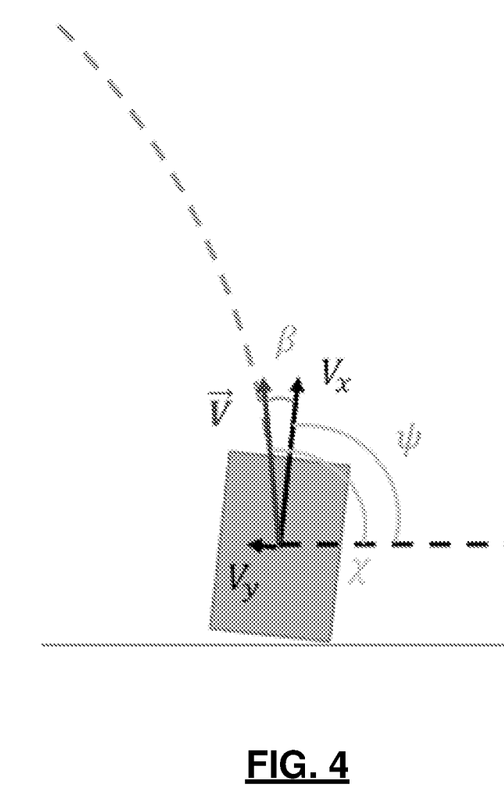
FIG. 4 is an illustration of a vehicle and vehicle dynamics in accordance with various embodiments.

For example, as shown in FIG. 4, an example bicycle model for the vehicle 10 includes:

$$\dot{V}_y = -V_x\dot{\psi} + \frac{C_f}{m}\left(\delta - \beta - \frac{l_f\dot{\psi}}{V_x}\right) + \frac{C_r}{m}\left(-\beta + \frac{l_r\dot{\psi}}{V_x}\right) - g\phi, \text{ and}$$

$$\ddot{\psi} = l_f\frac{C_f}{I_{zz}}\left(\delta - \beta - \frac{l_f\dot{\psi}}{V_x}\right) - l_r\frac{c_r}{I_{zz}}\left(-\beta + \frac{l_r\dot{\psi}}{V_x}\right),$$

where $\phi$ represents a road bank angle, $\delta$ represents the road wheel angle, $V_x$ represents a desired velocity, $\dot{\kappa}_d$ represents a desired trajectory, $\psi$ represents the yaw rate reference, $\beta$ represents a sideslip angle $\beta = V_y/V_x$, m represents a mass of the autonomous vehicle, g represents gravity, $C_r$ represents corning stiffness of the rear tires, L represents wheel base, $l_r$ represents distance between vehicle rear axle and vehicle center of gravity (c.g.), $I_{zz}$ represents moment of inertia around the vertical axis, and $l_f$ represents distance between vehicle front axle and vehicle center of gravity. Given the example bicycle model and the relation of the sideslip angle $\beta$ to the kinematic course angle $\chi$ and the vehicle heading angle $\psi$, $\chi = \beta + \psi$, and a kinematic constraint imposed such that the change in vehicle course aligns with a target curvature $\kappa_d$ as $\dot{\chi} = \kappa_d V_x$, a resulting yaw rate model is:

$$\dot{\psi}\left(s^2 + l_r\frac{LC_r}{I_{zz}V_x}s + L\frac{C_r}{I_{zz}}\right) = l_f\frac{m}{I_{zz}}(\dot{\kappa}_d V_x^2 + g\dot{\phi}) + LV_x\kappa_d\frac{C_r}{I_{zz}}. \quad (1)$$

With the appropriate initial conditions, the yaw rate model is a standalone differential equation with a solution, $\dot{\psi}(t)$ that provides the yaw rate reference along the target trajectory. Thus, the yaw rate reference can be obtained through numerical integration of the yaw rate model of equation (1).

Provided the above yaw rate model, a relative heading model can be derived from the relation: $\dot{\beta} = \dot{\chi} - \dot{\psi}$, as:

$$\dot{\beta} = -\frac{LC_r}{l_f mV_x}\beta + \ddot{\psi}\frac{I_{zz}}{l_f mV_x} + \dot{\psi}\left(l_r\frac{LC_r}{I_{zz}V_x^2} - 1\right) - \frac{g\phi}{V_x}. \quad (2)$$

Likewise, the relative heading reference can be obtained through numerical integration of the relative heading model of equation (2). In various embodiments, the instructions for carrying out the models (1) and (2) are stored in the model datastore 102 as yaw rate model data 110 and relative heading model data 112.

In various embodiments, the yaw rate determination module 104 receives as input desired velocity data 114, trajectory curvature data 116, and road banking data 118. The yaw rate determination module 104 computes the yaw rate reference and yaw acceleration based on the received data 114-118 and numerical integration of the yaw rate model data 110 from the model datastore 102. The yaw rate determination module 104 provides yaw reference data 120 based on the computed values.

For example, the yaw rate references can be computed along a receding horizon by solving the yaw rate model (1) numerically for each point along the receding horizon. In such example, the yaw rate references are re-initialized and re-computed for every instance of the control routine.

In another example, the yaw rate references can be computed along a receding horizon by solving the yaw rate model (1) for each prediction point independently by integrating the point data in real time. As can be appreciated, other methods of numerically integrating the yaw rate reference model can be implemented in accordance with the various embodiments as the disclosure is not limited to the present examples.

In various embodiments, the relative heading determination module 106 receives as input the desired velocity data 114, the yaw rate reference data 120, and the road banking data 118. The relative heading determination module 106 computes a relative heading reference based on the received data 114, 120, 118 and numerical integration of the relative heading model data 112 from the model datastore 102. The relative heading determination module 106 provides relative heading reference data 122 based on the computed values.

For example, the relative heading references can be computed along a receding horizon by solving the relative heading model (2) numerically for each point along the receding horizon. In such example, the relative heading references are re-initialized and re-computed for every instance of the control routine.

In another example, the relative heading references can be computed along a receding horizon by solving the relative heading model (2) for each point independently by integrating the point data in real time. As can be appreciated, other methods of numerically integrating the yaw rate reference model can be implemented in accordance with the various embodiments as the disclosure is not limited to the present examples.

In various embodiments, the trajectory control module 108 receives as input the yaw reference data 120 and the relative heading reference data 122. The trajectory control module 108 tracks the trajectory of the vehicle 10 along the desired curve based on the received input 120, 122. For example, when the yaw rate reference and the relative heading reference are solved according to the first method, the trajectory control module 108 uses model predictive control and the yaw rate reference, and the relative heading reference to generate control signals 124 control the trajectory. In another example, when the yaw rate reference and the relative heading reference are solved according to the second method, the trajectory control module 108 uses error feedback or feed forward control and the yaw rate reference, and the relative heading reference to generate control signals 124 control the trajectory. As can be appreciated, other control methods can be implemented in accordance with the various embodiments as the disclosure is not limited to the present examples.

Figure 5:
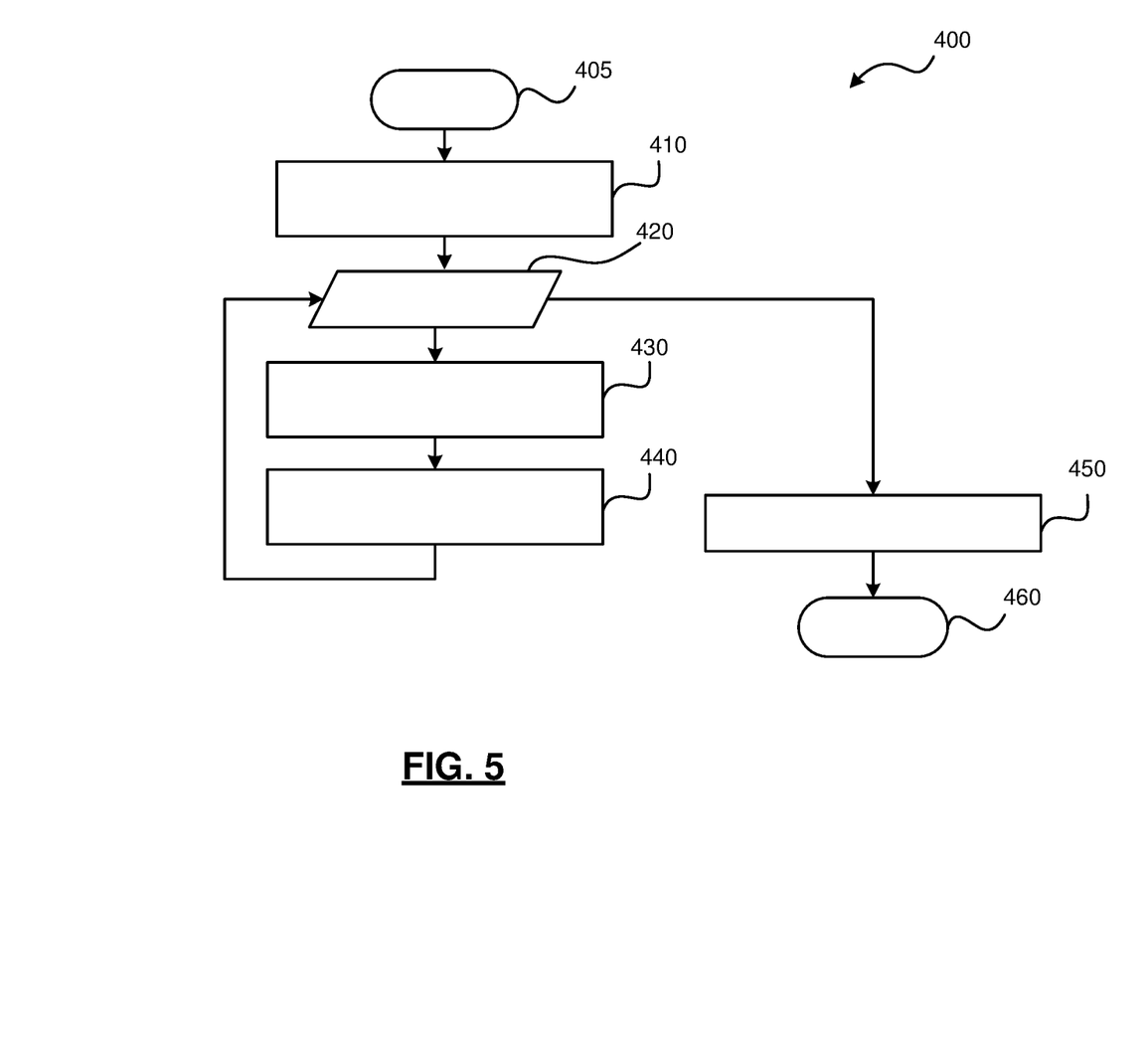
FIGS. 5 and 6 are process flow charts depicting example processes for trajectory tracking in accordance with various embodiments.
Figure 6:
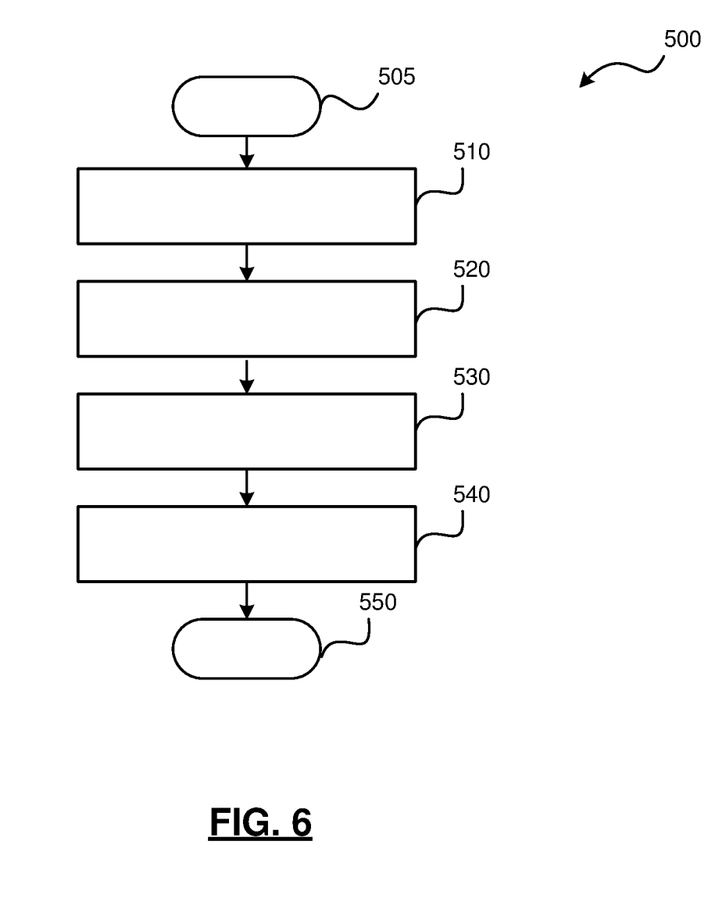

Referring now to FIGS. 5 and 6, and with continued reference to FIGS. 1-4, flowcharts illustrate a process 400 and a process 500 that can be performed by the trajectory tracking system 100 of FIG. 1 in accordance with the present disclosure. As can be appreciated in light of the disclosure, the order of operation within the processes 400, 500 is not limited to the sequential execution as illustrated in FIGS. 5 and 6, but may be performed in one or more varying orders as applicable and in accordance with the present disclosure. In various embodiments, the processes 500, 600 can be scheduled to run based on one or more predetermined events, and/or can run continuously during operation of the autonomous vehicle 10.

In one embodiment, the process 400 may begin at 405. The input data including the desired velocity data, the trajectory curvature data, and the road banking data is received at 410. For each point along the trajectory curvature (k0, k1, k2, . . . kn) at 420, the yaw rate reference is computed through numerical integration of the yaw rate model at 430, and the relative heading reference is computed through numerical integration of the relative heading model at 440. Once the reference values are computed for each point at 420, the reference values are used to track the vehicle's trajectory using, for example, model predictive control at 450. Thereafter, the process 400 may end at 460.

In another embodiment, the process 500 may begin at 505. The input data including the desired velocity data, the trajectory curvature data, and the road banking data is received at 510. A next point along the trajectory curvature is selected and the yaw rate reference is computed for the point in real time through numerical integration at 520. The relative heading reference is computed for the point in real time through numerical integration at 530. The reference values are used to track the vehicle's trajectory using, for example, error feedback control and/or feedforward control at 540. Thereafter, the process 500 may end at 550.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A motion control system of an autonomous vehicle, the motion control system comprising a controller, the controller configured to:
    receive target trajectory data associated with an upcoming trajectory of the autonomous vehicle;
    determine a yaw rate reference and a relative heading reference associated with the upcoming target trajectory based on a numerical integration of the target trajectory data; and
    control a trajectory of the autonomous vehicle based on the yaw rate reference and the relative heading reference.

2. The motion control system of claim 1, wherein the target trajectory data includes a desired vehicle velocity.

3. The motion control system of claim 1, wherein the target trajectory data includes a trajectory curvature.

4. The motion control system of claim 1, wherein the target trajectory data includes a road banking angle.

5. The motion control system of claim 1, wherein the numerical integration is based on a bicycle model.

6. The motion control system of claim 5, wherein the numerical integration of the yaw rate reference is based on:

$$\dot{\psi}\left(s^2 + l_r\frac{LC_r}{I_{zz}V_x}s + L\frac{C_r}{I_{zz}}\right) = l_f\frac{m}{I_{zz}}(k_d V_x^2 + g\dot{\phi}) + LV_x\kappa_d\frac{C_r}{I_{zz}},$$

where $V_x$ represents a desired velocity, $\dot{\kappa}_d$ represents a desired trajectory, $\phi$ represents a road banking angle, $\psi$ represents the yaw rate reference, m represents a mass of the autonomous vehicle, g represents gravity, $C_r$ represents a cornering stiffness on a rear tire, L represents a vehicle wheel base, $l_r$ represents a distance between a rear axle and a center of gravity, $I_{zz}$ represents a vehicle moment of inertia relative to a vertical axis, and $l_f$ represents a distance between a front axes and the center of gravity.

7. The motion control system of claim 5, wherein the numerical integration of the relative heading reference is based on:

$$\dot{\beta} = -\frac{LC_r}{l_f m V_x}\beta + \ddot{\psi}\frac{I_{zz}}{l_f m V_x} + \dot{\psi}\left(l_r\frac{LC_r}{I_{zz}V_x^2} - 1\right) - \frac{g\phi}{V_x},$$

where $\beta$ represents relative heading, $V_x$ represents a desired velocity, $\dot{\kappa}_d$ represents a desired trajectory, $\phi$ represents a road banking angle, $\psi$ represents the yaw rate reference, m represents a mass of the autonomous vehicle, g represents gravity, $C_r$ represents a cornering stiffness on a rear tire, L represents a vehicle wheel base, $l_r$ represents a distance between a rear axle and a center of gravity, $I_{zz}$ represents a vehicle moment of inertia relative to a vertical axis, and $l_f$ represents a distance between a front axes and the center of gravity.

8. A method in a vehicle for exercising motion control, the method comprising:
receiving, by a processor, target trajectory data associated with an upcoming trajectory of the autonomous vehicle;
determining, by the processor, a yaw rate reference and a relative heading reference associated with the upcoming target trajectory based on a numerical integration of the target trajectory data; and
controlling, by the processor, a trajectory of the autonomous vehicle based on the yaw rate reference and the relative heading reference.

9. The method of claim 8, wherein the target trajectory data includes a desired vehicle velocity.

10. The method of claim 8, wherein the target trajectory data includes a trajectory curvature.

11. The method of claim 8, wherein the target trajectory data includes a road banking angle.

12. The method of claim 8, wherein the numerical integration is based on a bicycle model.

13. The method of claim 12, wherein the numerical integration of the yaw rate reference is based on:

$$\dot{\psi}\left(s^2 + l_r\frac{LC_r}{I_{zz}V_x}s + L\frac{C_r}{I_{zz}}\right) = l_f\frac{m}{I_{zz}}(k_d V_x^2 + g\dot{\phi}) + LV_x\kappa_d\frac{C_r}{I_{zz}},$$

where $V_x$ represents a desired velocity, $\dot{\kappa}_d$ represents a desired trajectory, $\phi$ represents a road banking angle, $\psi$ represents the yaw rate reference, m represents a mass of the autonomous vehicle, g represents gravity, $C_r$ represents a cornering stiffness on a rear tire, L represents a vehicle wheel base, $l_r$ represents a distance between a rear axle and a center of gravity, $I_{zz}$ represents a vehicle moment of inertia relative to a vertical axis, and $l_f$ represents a distance between a front axes and the center of gravity.

14. The method of claim 12, wherein the numerical integration of the relative heading reference is based on:

$$\dot{\beta} = -\frac{LC_r}{l_f m V_x}\beta + \ddot{\psi}\frac{I_{zz}}{l_f m V_x} + \dot{\psi}\left(l_r\frac{LC_r}{I_{zz}V_x^2} - 1\right) - \frac{g\phi}{V_x},$$

where $\beta$ represents relative heading, $V_x$ represents a desired velocity, $\dot{\kappa}_d$ represents a desired trajectory, $\phi$ represents a road banking angle, $\psi$ represents the yaw rate reference, m represents a mass of the autonomous vehicle, g represents gravity, $C_r$ represents a cornering stiffness on a rear tire, L represents a vehicle wheel base, $l_r$ represents a distance between a rear axle and a center of gravity, $I_{zz}$ represents a vehicle moment of inertia relative to a vertical axis, and $l_f$ represents a distance between a front axes and the center of gravity.

15. A non-transitory computer readable media encoded with programming instructions configurable to cause a controller in a vehicle to perform a method for motion control, the method comprising:
receiving target trajectory data associated with an upcoming trajectory of the autonomous vehicle;
determining a yaw rate reference and a relative heading reference associated with the upcoming target trajectory based on a numerical integration of the target trajectory data; and
controlling a trajectory of the autonomous vehicle based on the yaw rate reference and the relative heading reference.

16. The non-transitory computer readable media of claim 15, wherein the target trajectory data includes a road banking angle, a desired vehicle velocity, and a trajectory curvature.

17. The non-transitory computer readable media of claim 15, wherein the numerical integration is based on a bicycle model.

18. The non-transitory computer readable media of claim 15, wherein the numerical integration of the yaw rate reference is based on:

$$\dot{\psi}\left(s^2 + l_r\frac{LC_r}{I_{zz}V_x}s + L\frac{C_r}{I_{zz}}\right) = l_f\frac{m}{I_{zz}}(k_d V_x^2 + g\dot{\phi}) + LV_x\kappa_d\frac{C_r}{I_{zz}},$$

and wherein the numerical integration of the relative heading reference is based on:

$$\dot{\beta} = -\frac{LC_r}{l_f m V_x}\beta + \ddot{\psi}\frac{I_{zz}}{l_f m V_x} + \dot{\psi}\left(l_r\frac{LC_r}{I_{zz}V_x^2} - 1\right) - \frac{g\phi}{V_x},$$

where $V_x$ represents a desired velocity, $\dot{\kappa}_d$ represents a desired trajectory, $\phi$ represents a road banking angle, $\psi$ represents the yaw rate reference, m represents a mass of the autonomous vehicle, g represents gravity, $C_r$ represents a cornering stiffness on a rear tire, L represents a vehicle wheel base, $l_r$ represents a distance between a rear axle and a center of gravity, $I_{zz}$ represents a vehicle moment of inertia relative to a vertical axis, and $l_f$ represents a distance between a front axes and the center of gravity.

19. The non-transitory computer readable media of claim 18, wherein the numerical integrations are performed based on a detected receding horizon, and wherein initial conditions of the numerical integrations are reinitialized at a start of the horizon and at every loop time of the motion control.

20. The non-transitory computer readable media of claim 18, wherein the numerical integrations are performed for each point along a receding horizon independently of each other, and wherein initial conditions of the numerical integration are reinitialized at a start of the motion control.

* * * * *